H. J. FOSTER.
DEMOUNTABLE RIM.
APPLICATION FILED JUNE 13, 1918.
1,299,451.
Patented Apr. 8, 1919.
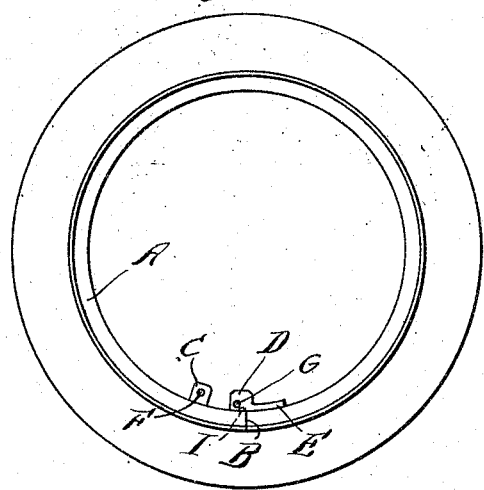
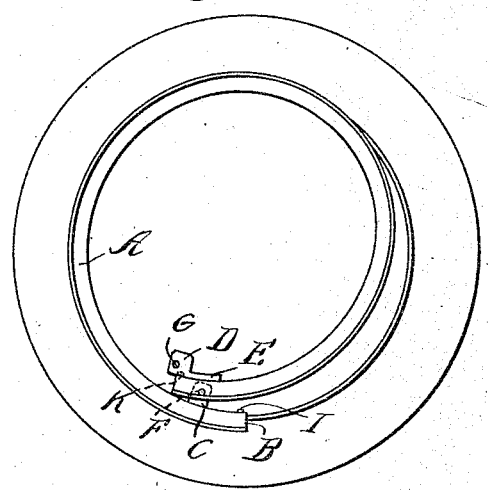
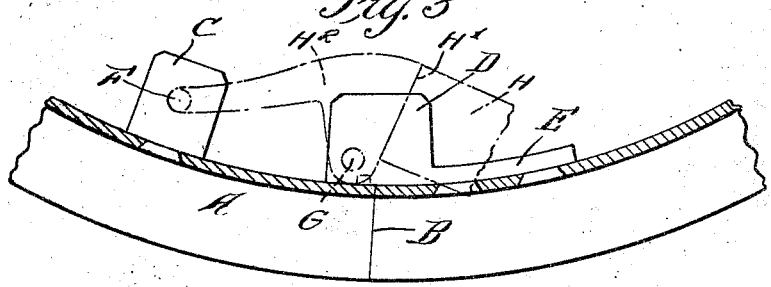
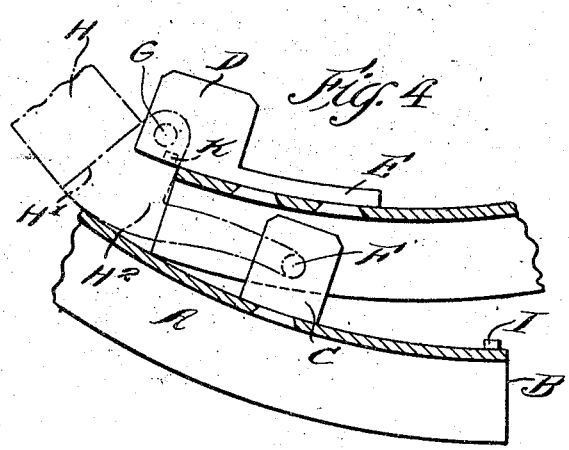
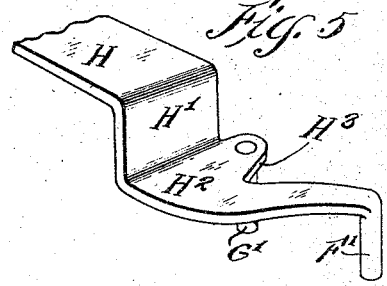
Inventor
H. J. Foster

UNITED STATES PATENT OFFICE.

HENRY J. FOSTER, OF CLEVELAND, OHIO, ASSIGNOR TO HYDRAULIC PRESSED STEEL COMPANY, OF CLEVELAND, OHIO, A CORPORATION OF OHIO.

DEMOUNTABLE RIM.

1,299,451.  Specification of Letters Patent.  Patented Apr. 8, 1919.

Application filed June 13, 1918. Serial No. 239,698.

*To all whom it may concern:*

Be it known that I, HENRY J. FOSTER, a citizen of the United States, residing at Cleveland, in the county of Cuyahoga and State of Ohio, have invented a certain new and useful Improvement in Demountable Rims, of which the following is a full, clear, and exact description, reference being had to the accompanying drawings.

This invention relates generally to a one piece transplit demountable tire-carrying rim and it has for its object to provide for the quick and easy contraction of the rim for the purpose of placing or removing the tire, and the equally easy restoration of the rim to its normal diameter and into operative relation with the tire.

Another object is to utilize a part of such rim operating means as driving lugs and also as means for locking the rim ends against circumferential and lateral movement.

With these objects in view the invention consists essentially in providing a one piece transplit tire-carrying rim with driving lugs connected to the ends of said rim, both of said driving lugs being preferably positioned upon the same side of the transverse division of the rim, said lugs being shaped for engagement with transverse members of an operating tool for the purpose of contracting or expanding said rim.

The invention consists also in certain details of construction and arrangement, all of which will be fully described hereinafter and set forth in the appended claims.

In the drawings forming a part of this specification, I have shown one embodiment of my invention and in these drawings Figure 1 is a side elevation of the tire-carrying rim with the tire applied thereto, said rim being expanded and locked in its normal condition. Fig. 2 is a similar view showing the rim contracted or collapsed for the quick and easy placement or removal of the tire. Fig. 3 is an enlarged view, partly in elevation showing the ends of the rim in their closed and locked position, the head of the operating wrench being indicated in dotted lines. Fig. 4 is a similar view showing the position of the parts when the rim is in its opened or collapsed position and locked, and Fig. 5 is a detailed perspective view of the wrench head.

In the practical embodiment of my invention I employ a one piece tire-carrying rim A divided at one point B by a straight cut, that is, the rim is divided upon an axial line or in a radical plane. This rim may be either straight side or clencher and any type of rim fastening device may be employed for securing this tire-carrying rim to the wheel body.

A lug, stud, or block C is attached to the inner face of the rim adjacent to the transverse division B and this lug, stud or block is preferably arranged about mid-way of the base of the rim and is intended to be utilized as a driving lug, it being brought into engagement with a suitable opening in the fixed rim of the wheel body as usual. This lug, stud, or block is preferably rectangular in shape.

Another lug, stud, or block D is connected to the other end of the rim through the medium of a plate E the stud or block D being either an integral part of the plate or rigidly connected thereto in any suitable manner, and it will be noted that the lug or block D extends across or beyond the transverse division B so that it may be said that both of the lugs or blocks are on the same side of the division point. The lug or block D is also intended to be utilized as a driving lug and is brought into engagement with a suitably shaped opening in the fixed rim of the wheel body. The lug or block C is provided or formed with a transverse or axial opening or passage F and the block D is provided with a similar opening or passage G; and it will be noted that the opening or passage F is nearer to the center of the rim than the opening or passage G. By positioning the lugs C and D in the manner described, and arranging the openings or passages F and G as set forth I am able to quickly and easily contract or collapse the rim from its normal position such as shown in Fig. 1 and Fig. 3, to the position shown in Fig. 2 and Fig. 4, by means of a lever H having transversely extending prongs or members capable of engaging the blocks by being passed into the transverse openings or passages F and G. I have shown one form of tool consisting of a flat bar of metal H upset as H' and having a head H² substantially parallel with the bar or lever; this head having the pins or prongs F' and G' which are adapted to be inserted in the openings F and G.

In Fig. 3 I have indicated in dotted lines the engagement of lever or tool with the lugs preparatory to contracting the rim, and in Fig. 4 I have shown the lever or tool as moved through an arc of approximately 180° and also indicated the locked position of the rim in its opened or contracted position; and it will be noted that the head of the lever is made with a reëntrant angle H³ which permits the end of the rim carrying the lug G to travel the proper distance to effect the locking of the rim in its opened or contracted position.

As before stated, the opening F is closer to the center of the rim than the opening G and when the lever is brought into engagement with the block C as previously described, this block is used as a fulcrum for the lever and consequently during the initial turning movement of the lever the ends of the rim A are first circumferentially separated slightly so that during the continued inward movement of the end of the rim carrying the block D, said end will entirely clear the opposite end of the rim, notwithstanding the fact that the cut B is a straight and radial cut. The turning movement of the lever is continued until the lug or block D passes beyond the lug or block C and as soon as this has been accomplished the resiliency of the rim tends to carry the inner or contracted end of the rim to its ultimate and locked position as shown in Fig. 4, the cut out portion of the lever head H³ permitting the base of the rim to move inwardly a sufficient distance to effect a complete and safe locked position of the rim in its contracted condition.

When the rim has thus been contracted it is obvious that the tire can be quickly and easily placed thereon or removed therefrom.

In order to return the rim to its normal or expanded position, the lever is turned back, and when the block D in its return movement passes the block C, the resiliency of the rim will then act to facilitate the closing operation and bring the parts back to their normal position as shown in Fig. 3, and inasmuch as the plate E with lug D extends beyond the transverse division B and inasmuch as opening G is farther removed from the center of the rim than the opening F it is obvious that a locking engagement will be effected between the overlapping lug and the adjacent end of the rim, and if desired, a stud or pin I can be placed upon the interior of one end of the rim for the purpose of engaging a socket or recess K in the projecting portion of the plate. This will prevent any possible separation of the rim ends when the rim is not upon a wheel body. Furthermore when the ends of a perfectly straight cut rim are locked together in this manner it will be impossible to have any lateral movement of either rim end.

It will thus be seen that I provide an exceedingly simple construction of demountable tire-carrying rim, provided with driving lugs so positioned and constructed that by means of a simple lever the said rim can be quickly and easily contracted and expanded in order to render possible the quick and easy placement or removal of a tire having an inextensible bead.

Having thus described my invention what I claim is:

1. A transplit demountable tire carrying rim having inwardly projecting lugs connected thereto, said lugs being constructed for engagement with a tool, and so positioned with reference to the split in said rim that the initial movement of the tool will cause a circumferential separation of the ends of the rim.

2. A one-piece tire carrying rim of the flanged type transplit at one point, driving lugs connected to the ends of said rim, said lugs having openings parallel with the axis of the rim said openings being adapted to receive members of a lever adapted to turn in a plane transverse to the axis of the rim, and whereby the rim will be contracted or returned to its normal diameter.

3. A one-piece tire carrying rim transplit at one point, driving lugs connected to the ends of said rim, said lugs having axial openings adapted to receive members of a lever, said openings being placed at different distances from the center of said rim.

4. A one-piece tire carrying rim transplit at one point, lugs connected to the ends of said rim, said lugs having transverse openings adapted to receive spaced members of a wrench, both of said lugs being upon the same side of the transverse split.

5. A one-piece tire carrying rim transplit at one point, lugs connected to the ends of said rim, one of said lugs extending beyond the dividing split, both of said lugs having transverse openings adapted to receive spaced members of an operating lever.

6. A one-piece tire carrying rim split at one point, an inwardly projecting lug attached to said rim adjacent said split, a lug attached to the other end of the rim and extending beyond said split, said lugs having axial apertures said apertures being different distances from the center of the rim and adapted to receive spaced members carried by an actuating lever.

7. A one-piece tire carrying rim divided transversely at one point, a plate attached to one end of the rim and extending beyond the division of said rim, a driving lug carried by said plate at the projecting end thereof, a driving lug connected to the opposite end of said rim and spaced from the first mentioned lug, said lugs having axial passages adapted to receive spaced members of an actuating lever.

8. A one-piece tire carrying rim divided transversely at one point, a lug attached to one end of rim, a lug attached to the rim adjacent the dividing line and spaced from the first mentioned lug, both of said lugs being positioned upon one side of the dividing line, said lugs having axial openings, the opening of the lug remote from the dividing line being nearer the center than the opening of the lug adjacent the dividing line.

9. A one-piece tire carrying rim divided at one point, inwardly projecting portions connected to the rim ends said inwardly projecting portions being adapted and positioned for engagement with laterally projecting members of a lever, the point of engagement being upon the same side of the split but at different distances from the center of the rim.

In testimony whereof I hereunto affix my signature.

HENRY J. FOSTER.